United States Patent
Kumar et al.

(10) Patent No.: US 11,343,564 B2
(45) Date of Patent: May 24, 2022

(54) AUTOMATED LEARNING PLATFORM OF A CONTENT PROVIDER AND METHOD THEREOF

(71) Applicant: Samsung Electronics Co., Ltd., Gyeonggi-do (KR)

(72) Inventors: Ashwini Kumar, Noida (IN); Nikhil Verma, Noida (IN); Anil Kumar, Noida (IN)

(73) Assignee: Samsung Electronics Co., Ltd

( * ) Notice: Subject to any disclaimer, the term of this patent is extended or adjusted under 35 U.S.C. 154(b) by 142 days.

(21) Appl. No.: 16/991,619

(22) Filed: Aug. 12, 2020

(65) Prior Publication Data
US 2021/0051354 A1    Feb. 18, 2021

(30) Foreign Application Priority Data

Aug. 14, 2019    (IN) .............................. 201911032914

(51) Int. Cl.
*H04N 21/44* (2011.01)
*G06V 10/25* (2022.01)
*H04N 21/422* (2011.01)

(52) U.S. Cl.
CPC ....... *H04N 21/44008* (2013.01); *G06V 10/25* (2022.01); *H04N 21/42204* (2013.01)

(58) Field of Classification Search
None
See application file for complete search history.

(56) References Cited

U.S. PATENT DOCUMENTS

| | | | |
|---|---|---|---|
| 7,020,336 B2* | 3/2006 | Cohen-Solal | H04N 5/222 348/E5.022 |
| 9,131,264 B2* | 9/2015 | Oh | H04N 21/2355 |
| 11,113,537 B2* | 9/2021 | Deng | G06V 10/454 |
| 2012/0314951 A1 | 12/2012 | Okabe | |
| 2015/0137959 A1* | 5/2015 | Kim | G08C 17/02 340/12.28 |
| 2017/0195612 A1* | 7/2017 | Yoon | H04N 21/42204 |

(Continued)

OTHER PUBLICATIONS

Indian Examination Report dated May 27, 2021 issued in counterpart application No. 201911032914, 5 pages.

(Continued)

*Primary Examiner* — William J Kim
(74) *Attorney, Agent, or Firm* — The Farrell Law Firm, P.C.

(57) ABSTRACT

An automated learning system of a content provider includes a database, an image processing unit, and a server. The database stores data related to visual marks, features of the visual marks, a set of discriminating instances, a position of a region of interest, and pre-defined threshold values. The image processing unit includes a detection module, a determination module, and a feature generation module. The detection module detects frames from a primary display device. The determination module extracts a static visual area, and determines a visual mark. The feature generation module generates discriminating features of the visual mark. The server maps the discriminating features with the stored data, identifies at least one closest visual mark, and transmits the updated visual mark and the discriminating features to secondary display devices.

20 Claims, 16 Drawing Sheets

(56) References Cited

U.S. PATENT DOCUMENTS

| | | | |
|---|---|---|---|
| 2018/0075300 A1 | 3/2018 | Mai et al. | |
| 2018/0103285 A1* | 4/2018 | Kim | H04N 21/4383 |
| 2018/0249112 A1* | 8/2018 | Kim | H04N 21/42225 |
| 2018/0270525 A1* | 9/2018 | Yu | H04N 21/42204 |
| 2018/0288496 A1* | 10/2018 | Ade | G06F 40/109 |
| 2018/0302661 A1* | 10/2018 | Ahn | G06F 3/038 |
| 2020/0090007 A1* | 3/2020 | Joseph | G06K 9/6223 |
| 2020/0150829 A1* | 5/2020 | Park | G06K 9/6284 |
| 2021/0014560 A1* | 1/2021 | Choi | H04N 21/251 |
| 2021/0034878 A1* | 2/2021 | Deng | G06V 20/46 |

OTHER PUBLICATIONS

Wang, Jinqiao, et al. "Automatic TV logo detection, tracking and removal in broadcast video." International Conference on Multimedia Modeling. Springer, Berlin, Heidelberg, 2007.

Konecny, Jakub, et al. "Federated learning: Strategies for improving communication efficiency." arXiv preprint arXiv: 1610.05492 (2016.).

\* cited by examiner

AUTOMATED LEARNING PLATFORM OF A CONTENT PROVIDER AND METHOD THEREOF

CROSS-REFERENCE TO RELATED APPLICATION(S)

This application is based on and claims priority under 35 U.S.C. § 119 to Indian Patent Application No. 201911032914, filed on Aug. 14, 2019, in the Indian Intellectual Property Office, the disclosure of which is incorporated by reference herein in its entirety.

BACKGROUND

1. Field

The disclosure relates generally to a learning platform for identifying a plurality of devices, and more particularly to a computing platform for automated learning of content providers.

2. Description of Related Art

Smart television (TV) industries are growing fast. With recent advancements in machine learning (ML) and capable hardware, TVs are becoming smarter by providing on-device solutions and enabling more services to enhance a user experience. With smart TVs having a capability to connect multiple devices, such as set top boxes (STBs), Blu-ray disk (BD) players, and gaming consoles, it becomes important to identify the connected devices if the TV wants to enable some services for a specific device. Many devices offer identification through high-definition multimedia interface consumer electronics control (HDMI-CEC), however not all STBs in the market currently having this feature. Further, with many devices connected to a TV, it becomes cumbersome to operate each device with its own remote control unit. Hence, a universal remote feature may be handy, by enabling control of different connected devices using vision techniques and analyzing a display screen for a device visual mark or logo. Such a remote control unit may send infrared (IR) signals for that device to the TV.

Many industries provide a "one remote" function with its TVs for controlling the HDMI source devices connected to TV through the remote control unit. After identifying the connected devices, the IR code sets required to control them are configured to the remote control unit as a part of an auto-device setup sequence. This feature is already expanded and commercialized for controlling the STBs. For enabling the remote control unit to control the STBs, a multi-system operator (MSO) provider is detected by its visual mark from the display screen through vision based analysis and a machine learning model, and then configures the required IR code set on the remote control unit, such that the remote control unit can send IR signals to the STB. Further, the auto-device setup of STBs and configuration of the remote control unit is supported by many countries and MSOs, thereby enabling easy control of STBs connected to the Smart TV. For auto-device setup, a user has to connect the STB with the TV via an HDMI connection. The TV then captures a frame from the STB, and detects a visual mark/logo region (i.e., a region of interest (ROI)) by vision analysis. After detecting the region, the TV identifies the region from the ROI image using a trained machine learning model, and sends the IR code set of the detected STB to the remote control unit, and the remote control unit controls the STB using the IR code set.

The visual mark/logo identification is performed using trained machine learning models. These models are trained on personal computers (PCs) using visual mark images collected from the devices and applied in the TV. When, for any reason the MSO provider's visual mark or user interface (UI) are changed, the auto-device setup procedure cannot work smoothly, and interruptions on the one remote function configuration may occur. The user may have to perform multiple manual steps to configure the TV remote control unit to be able to use the one remote function seamlessly. The auto-device setup function is limited to the number of devices supported using a pre-trained model. Only a fixed number of MSOs may be supported in a region. To scale the number of MSOs that are supported, a huge manual effort is required in collecting data, training and verification. Thus, the existing systems are not self-scalable. If the auto-device setup fails, the machine learning model may not be able to recognize and identify the new visual mark, which may disable the one remote function since the remote control unit does not receive any IR code sets of the device/STB. For example, the STB updates its UI and visual mark, the TV captures a frame from the STB with the updated visual mark, and detects a visual mark/logo region (i.e., an ROI) by vision analysis. Since, the ML model was not trained for the new visual mark, the visual mark identification/recognition also fails. The IR code sets are not sent to the remote control unit, and thus the remote control unit cannot control the STB.

For STB device setup, experts and engineers have to visit a field or collaborate with a service provider to collect new data of the new visual mark, which incurs travel and logistic costs, and also infringes upon the privacy of a user. The experts then manually annotate new data and train an ML model with the new data. Thus, human intervention takes place. Thereafter, the new model gets updated in TVs. The ML model has been trained on a server for recognizing the new visual mark. The TVs then receives the new model.

The disadvantages of existing manual techniques are that a customer/user experience is hampered until the fixed update is received, a scope of expansion is limited due to manual efforts involved in a manual process, and the service fix is distributed through an over the network (OTN) update, which incurs heavy costs to industries. Further, the entire cycle of data collection, training and deployment can take anywhere from 30-60 days, depending upon the number of MSOs and availability of data. This cycle also includes manual data annotation, model training and verification, system testing, and an OTN release. Furthermore, lots of data is required to train such models.

SUMMARY

The present disclosure has been made to address the above-mentioned problems and disadvantages, and to provide at least the advantages described below.

In accordance with an aspect of the present disclosure, a method for automated learning of a content provider includes storing, in a database, data related to indices, features of the indices, a set of discriminating instances, a position of an ROI of the indices, and pre-defined threshold values, detecting one or more frames of display from a primary display device, extracting at least one static visual area of the display from the frames, determining at least one index associated with the area based on at least two or more time instances, generating one or more discriminating features of the determined index, mapping, by a server, the generated discriminating features of the determined index with the stored data, and identifying at least one closest index, updating, by the server, the stored data associated with the closest index, and transmitting, by the server, the updated index and the discriminating features associated with the updated index to one or more secondary display devices.

According to another aspect of the present disclosure, an automated learning system of a content provider includes a memory, and a processor configured to store, in a database, data related to indices, features of the indices, a set of discriminating instances, a position of an ROI of the indices, and pre-defined threshold values, detect one or more frames of display from a primary display device, extract at least one static visual area of the display from the frames, determine at least one index associated with the area based on at least two or more time instances, generate one or more discriminating features of the determined index, map the generated discriminating features of the determined index with the stored data, and identify at least one closest index, update the stored data associated with the closest index, and transmit the updated index and the discriminating features associated with the updated index to one or more secondary display devices.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
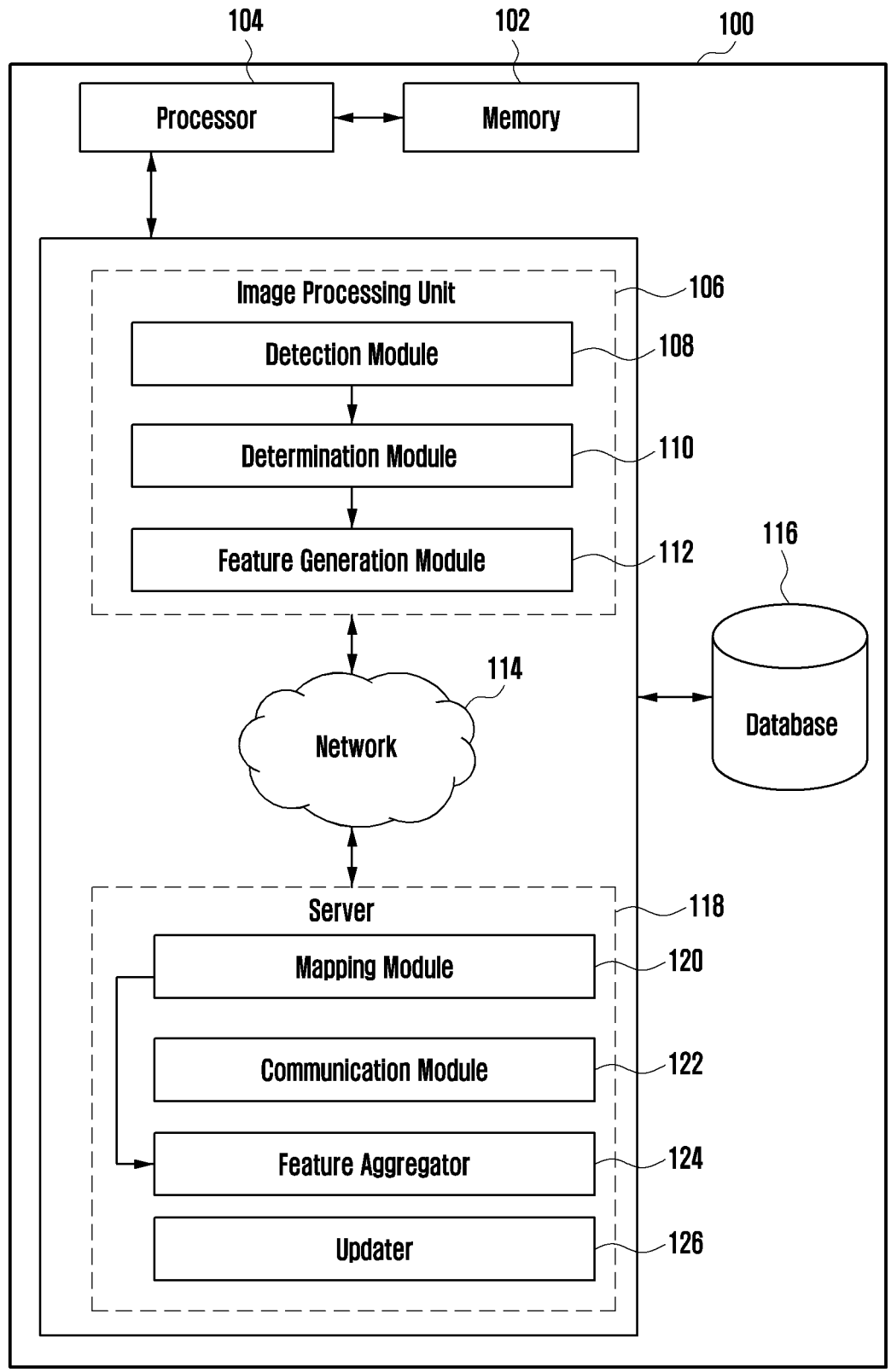
FIG. 1 illustrates a block diagram depicting an automated learning platform of a content provider, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

The various embodiments of the present disclosure provide an automated learning platform of a content provider and method thereof.

Furthermore, connections between components and/or modules within the figures are not intended to be limited to direct connections. Rather, these components and modules may be modified, re-formatted or otherwise changed by intermediary components and modules.

References in the disclosure to "one embodiment" or "an embodiment" mean that a particular feature, structure, characteristic, or function described in connection with the embodiment is included in at least one embodiment of the disclosure. The appearance of the phrase "in one embodiment" in various places in the specification are not necessarily all referring to the same embodiment.

In an embodiment, a method for automated learning of a content provider is provided. The method includes storing, in a database, data related to indices, features of the indices (i.e., visual marks), a set of discriminating instances, a position of an ROI of the indices, and pre-defined threshold values, detecting one or more frames of display from a primary display device, extracting at least one static visual area of the display from the frames, determining at least one index associated with the area based on at least two or more time instances, generating one or more discriminating features of the determined index, mapping, by a server, the generated discriminating features of the determined index with the stored data, and identifying at least one closest index, updating, by the server, the stored data associated with the closest index, and transmitting, by the server, the updated index and the discriminating features associated with the updated index to one or more secondary display devices.

The visual marks (i.e., indices) are associated with one or more set top box operators, content providers or multi-system operators.

The discriminating features of the determined visual mark (i.e., index) on the time instances are generated by using a visual analysis.

The method further includes aggregating discriminating features of one or more primary display devices, and generating a feature map, mapping, by the server, the aggregated discriminating features of the determined indices with the stored data, and identifying at least one closest index, updating, by the server, the stored data associated with the closest index, and transmitting, by the server, the updated index and the discriminating features associated with the updated index to the secondary display devices.

The method further includes generating, by each secondary display device, an index region, and identifying a closest match based on the generated feature map.

The method further includes capturing a set of frames of the display, and detecting one or more ROIs in the set of frames.

The method further includes classifying the ROIs, if the set of captured frames are within the pre-defined threshold values.

The feature map is generated, by the server, using a neural network having at least two or more identical sub-networks.

The neural network includes a siamese neural network, and an artificial neural network (ANN).

The method further includes filtering, by the server, the outliers from a plurality of clusters of the feature map for each index.

The method further includes computing, by the server, cluster centroids for each visual mark, and registering the visual mark on the feature map.

One or more discriminating features are generated by recognizing the discriminating features of the determined index on at least two instances.

The instances with the discriminating features received, by a server, include a learned model with a set of indices associated with a set of the operators.

The database is updated, by the server, based on at least one of the discriminating features, a set of discriminating instances, and one or more pre-defined rules.

The method further includes replicating, by the server, the learned model or the discriminating features on the secondary display devices.

The method further includes determining, by the secondary display device, at least one operator by utilizing the stored data.

The method further includes associating the secondary display device with a remote unit having an IR code set of information, and the information is mapped with the stored data.

The method further includes providing, by the remote unit, one-remote functionality, on the secondary display device.

In an embodiment, an automated learning system (i.e., a platform) of a content provider is provided. The system includes a memory, and a processor configured to store, in a database, data related to indices, features of the indices, a set of discriminating instances, a position of an ROI of the indices, and pre-defined threshold values, detect one or more frames of display from a primary display device, extract at least one static visual area of the display from the frames, determine at least one index associated with the area based on at least two or more time instances, generate one or more discriminating features of the determined index, map the generated discriminating features of the determined index with the stored data, and identify at least one closest index, update the stored data associated with the closest index, and transmit the updated index and the discriminating features associated with the updated index to one or more secondary display devices.

The processor is further configured to aggregate the discriminating features and generate a feature map, and map the aggregated discriminating features of the determined index received from the one or more primary display devices with the stored data.

FIG. 1 illustrates a block diagram depicting an automated learning platform of a content provider, according to an embodiment.

An automated learning platform (i.e., a system) of a content provider 100 (hereinafter referred to as a "platform") includes a memory 102, a processor 104, a database 116, an image processing unit 106, and a server 118.

The memory 102 is configured to store one or more pre-defined rules related to identification of visual marks associated with operators, detection of an ROI, and updated version of models. The memory 102 is also configured to store network related data. The memory 102 can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The memory 102 also includes a cache memory to work with the platform 100 more effectively.

The processor 104 is configured to cooperate with the memory 102 to receive the pre-determined rules. The processor 104 is further configured to generate platform processing commands. The processor 104 may be implemented as one or more microprocessors, microcomputers, microcontrollers, digital signal processors, central processing units, state machines, logic circuitries, and/or any devices that manipulate signals based on operational instructions. Among other capabilities, the at least one processor 104 is configured to fetch the pre-determined rules from the memory 102 and execute different modules of the platform 100.

The database 116 is configured to store data related to visual marks, features of the visual marks, a set of discriminating instances, a position of ROIs of the visual marks, and pre-defined threshold values for each visual mark. The visual marks are associated with one or more set top box operators, content providers, or multi-system operators (MSOs). The database 116 can be implemented as, but is not limited to, an enterprise database, a remote database, and a local database. The database 116 may be located either within the vicinity of other databases or may be located at a different geographic location. The database 116 can be implemented inside or outside the platform 100, and the database 116 can be implemented as a single database or multiple databases.

The image processing unit 106 is configured to cooperate with the processor 104 to receive the processing commands. The image processing unit 106 includes a detection module 108, a determination module 110, and a feature generation module 112.

The detection module 108 is configured to detect one or more frames of display content from a primary display device.

In an embodiment, the detection module 108 is configured to capture one or more frames of the display content of the primary display device, and detect frames from the captured images.

In an embodiment, the detection module 108 is configured to capture a set of frames of the display content, and detect one or more ROIs in the set of frames.

In an embodiment, the detection module 108 is configured to classify the ROIs in the database 116, if a number of the captured frames is greater than or within the pre-defined threshold values stored in the database 116.

The determination module 110 is configured to cooperate with the detection module 108 to receive the detected frames. The determination module 110 is configured to extract at least one static visual area of the display content from the frames, and determine at least one visual mark associated with the visual area based on at least two or more time instances.

The feature generation module 112 is configured to cooperate with the determination module 110 to receive the determined visual mark. The feature generation module 112 is further configured to generate one or more discriminating features of the determined visual mark.

In an embodiment, the feature generation module 112 is configured to generate the discriminating features of the determined visual mark on the time instances by using a visual analysis.

In an embodiment, the feature generation module 112 is configured to generate one or more discriminating features of the determined visual mark on the instances by learning the discriminating features of the determined visual mark based on at least two instances.

The server 118 is configured to cooperate with the image processing unit 106 over a network 114. The server 118 is configured to receive the instances with the discriminating features, which includes a learned module with a set of visual marks associated with a set of the operators. The network 114 includes wired or wireless networks. Examples of the wired networks include, but are not limited to, a wide area network (WAN) or a local area network (LAN), and a client-server network, a peer-to-peer network. Examples of the wireless networks include, but are not limited to, wireless fidelity (Wi-Fi), a global system for mobile communications (GSM) network, and a general packet radio service (GPRS) network, an enhanced data GSM environment (EDGE) network, 802.5 communication networks, code division multiple access (CDMA) networks, cloud network, or Bluetooth networks.

The server 118 is configured to receive the generated discriminating features from the image processing unit 106, and stored data from the database 116. The server 118 includes a mapping module 120 and a communication module 122.

The mapping module 120 is configured to map the generated discriminating features of the determined visual mark with the stored data, and identify at least one closest visual mark from the database 116. The mapping module 120 is further configured to update the stored data associated with the closest visual mark in the database 116.

The communication module 122 is configured to cooperate with the mapping module 120. The communication module 122 is configured to transmit the updated visual mark and the discriminating features associated with the updated visual mark to one or more secondary display devices.

In an embodiment, the server 118 further includes a feature aggregator 124. The feature aggregator 124 is configured to aggregate discriminating features received from the image processing unit 106 of one or more primary display devices, and generate a feature map. The feature aggregator 124 is further configured to generate the feature map using a neural network having two or more identical sub-networks. The neural network includes a siamese neural network, and an ANN.

In an embodiment, the feature aggregator 124 is configured to filter the outliers from a plurality of clusters of the feature map for each visual mark, and compute cluster centroids for each visual mark and register the visual mark on the feature map.

In an embodiment, the mapping module 120 is configured to cooperate with the feature aggregator 124 to receive the aggregated discriminating features. The mapping module 120 is further configured to map the aggregated discriminating features of the determined visual marks received from the one or more primary display devices with the stored data, and identify at least one closest visual mark from the database 116, and update the stored data associated with the closest visual mark. The communication module 122 is configured to cooperate with the mapping module 120. The communication module 122 is configured to transmit the updated visual mark to the one or more secondary display devices.

In an embodiment, each secondary display device is configured to generate a visual mark region, and identify a closest match on the generated feature map.

In an embodiment, the server 118 includes an updater 126. The updater 126 is configured to update the database 116 based on at least one of the discriminating features, a set of discriminating instances, and the pre-defined rules.

In an embodiment, the server 118 is configured to replicate the learned model in said database 116 or mapping of said discriminating features on the secondary display devices. The server 118 is further configured to determine at least one operator of at least one secondary display device by utilizing the learning model. The secondary display device is associated with a remote unit with an IR code set of information. The information is mapped with the stored data, and the remote unit is further configured to provide one-remote functionality on the secondary display device.

Figure 2:
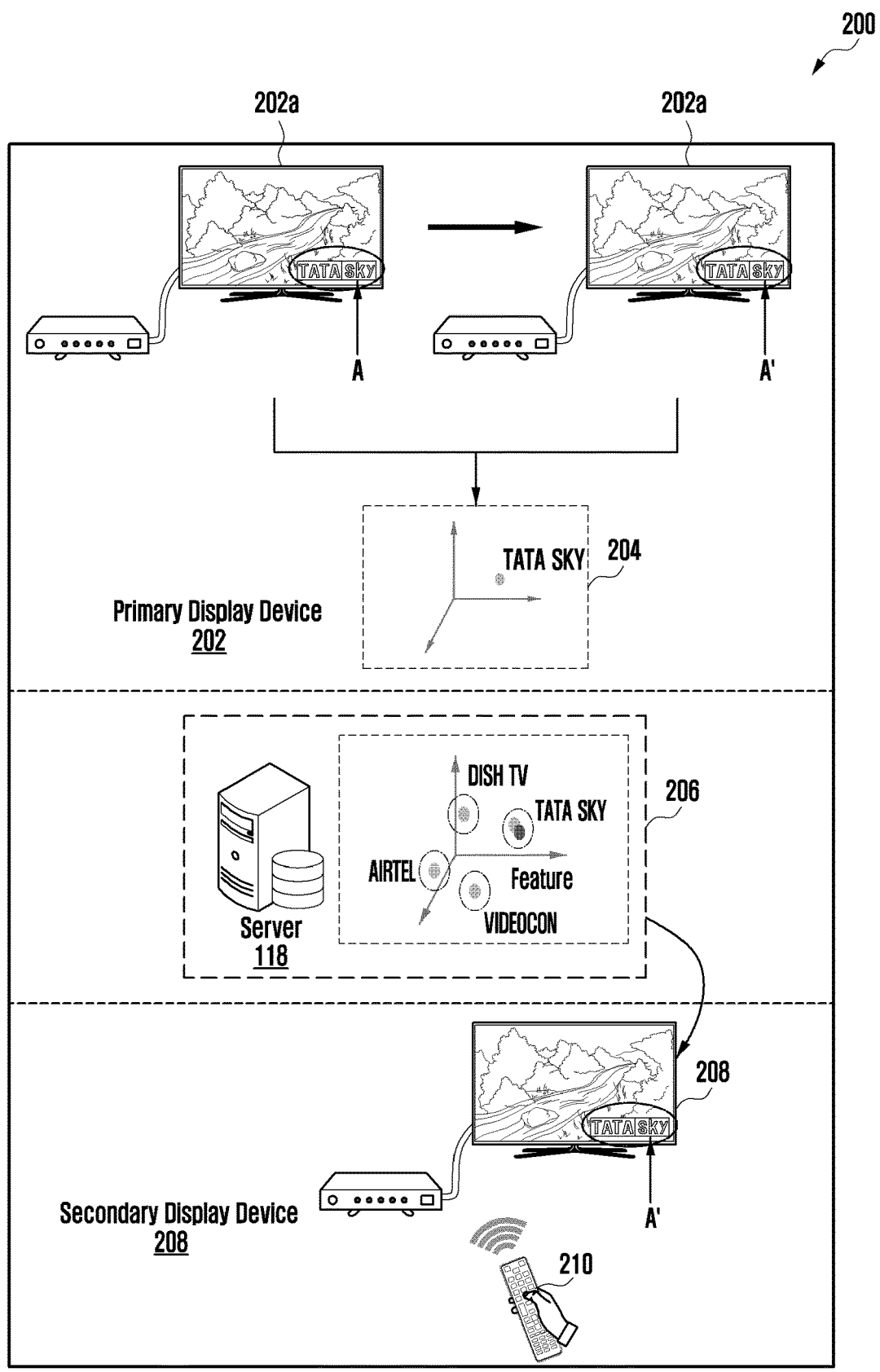
FIG. 2 illustrates a schematic diagram depicting an arrangement of a primary display device, a server, and a secondary device in a computing platform of FIG. 1, according to an embodiment.

FIG. 2 illustrates a schematic diagram depicting an arrangement 200 of a primary display device, a server, and a secondary display device in the computing platform of FIG. 1, according to an embodiment.

The arrangement 200 includes a primary display device 202, a server 118, and a secondary display device 208. The primary display device 202 and a secondary display device 208 can be a TV, a smart display device, or a display screen.

The primary display device 202a displays a visual mark A of the set top box unit. In an embodiment, an image processing unit 106 is configured to determine the visual mark A from display content of the primary display device 202a. If the visual mark is changed or updated, the image processing unit 106 automatically discriminates the features of the determined visual mark A, and identify a new visual mark A'. The primary display device 202a then generates features of the new visual mark A', and generates a feature map for A'. The primary display device 202a then shares the generated features with the server 118. The server 118 aggregates feature maps received from one or more primary display devices, and generates a global feature map 206. The global feature map 206 includes all the different visual marks associated with different operators. The secondary display device 208 automatically gets the features from the server 118 from the global feature map.

In an embodiment, a mapping module 120 is configured to map the aggregated features of the visual marks received from the one or more primary display devices with the stored data, and identify at least one closest visual mark A' from the database 116 and transmit the visual mark A' to the secondary display device 208. The secondary display device 208 automatically detects the MSO.

In an embodiment, a remote unit 210 associated with the secondary display device 208 controls the STB automatically.

Figure 3:
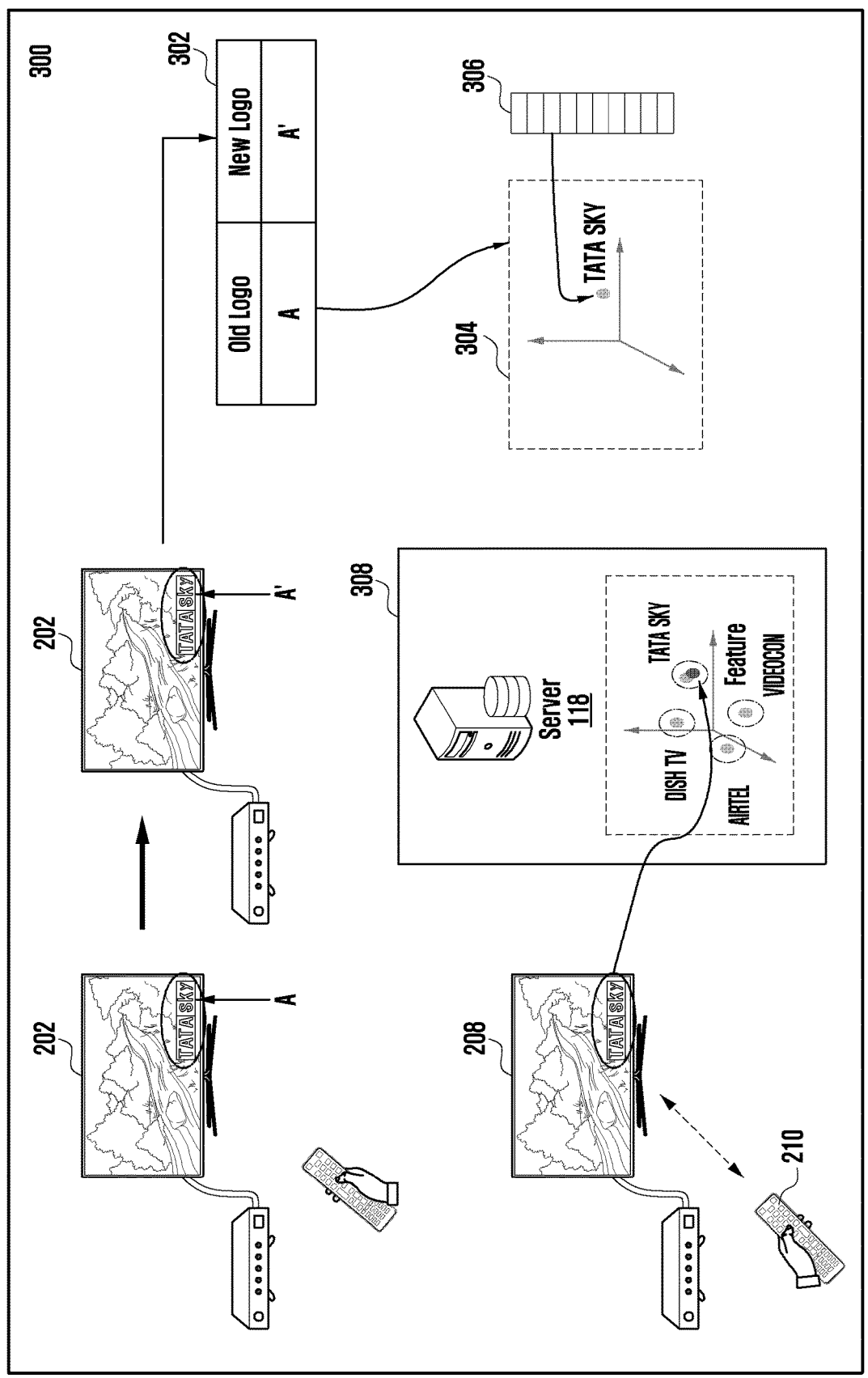
FIG. 3 illustrates a schematic diagram depicting a workflow of the automated learning platform of FIG. 1, according to an embodiment.

FIG. 3 illustrates a schematic diagram depicting a workflow 300 of the automated learning platform of FIG. 1, according to an embodiment.

In an embodiment, the platform 100 of FIG. 1 is configured to analyze the user's display device STB setup to detect an STB visual mark change. If any change in the visual mark is detected, the platform 100 automatically generates discriminating features of the visual mark, and shares the generated discriminating features with the server 118. The discriminating features are used to enable auto-setup of the remote unit with IR code sets of the connected STB.

In an embodiment, the server 118 is configured to maintain a global feature map, aggregating all local features from the primary display devices 202. Users buying new display devices (i.e. secondary display devices) or new STB connections can use the feature map to automatically identify the closest matching STB and setup the remote unit with corresponding IR code sets.

In an embodiment, a first user configures one remote function for the primary display device 202 having an STB device with a visual mark A. An STB provider updates the device, and hence the visual mark changes to a new visual mark (i.e., A'). The primary display device 202 automatically detects the visual mark change, and identifies the new visual mark region in the display content using visual analysis, as shown in 302, where the primary display device 202 detects an old logo A, and new logo A'. The primary display device 202 then generates features of the new visual mark A' and maps the features to a feature space, as shown in 304 and 306, wherein the features are mapped on D-dimensional space, and the features are D-dimensional features 306.

In an embodiment, the primary display device 202 is configured to generate a local feature map. The primary display device 202 then transmits the local feature map and the visual mark location coordinates to the server 118. The server 118 maintains a global feature map for aggregating features received from one or more primary display devices. When a second user plugs in the STB with a new visual mark associated with a secondary display device 208 using a remote unit 210, the secondary display device generates features of the visual mark region and finds a closest match in the global feature map. The remote unit 210 is then setup with the IR code set of an STB with a closest matching feature.

Figure 4:
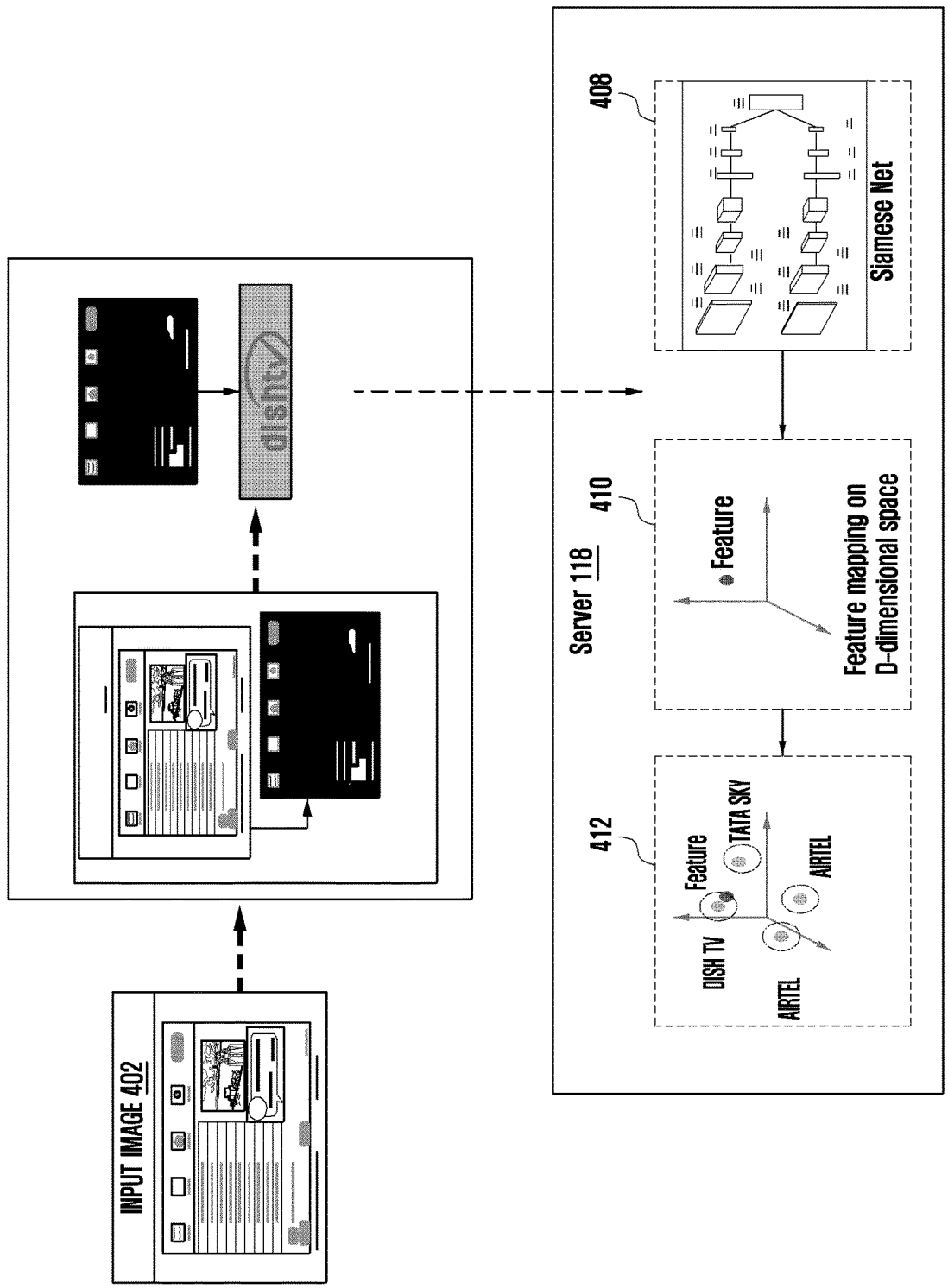
FIG. 4 illustrates a schematic diagram depicting determining an index, according to an embodiment.

FIG. 4 illustrates a schematic diagram 400 depicting determining a visual mark using an image processing unit, according to an embodiment.

In FIG. 4, the platform 100 is configured to detect display content from a primary display device 202. The display content can be considered as an input image 402. The input image is then transmitted to an image processing unit 106. The image processing unit 106 is configured to detect one or more frames of the input image, and extract at least one visual area from the frame, by using a gradient computation technique 404. The image processing unit 106 is further configured to determine at least one visual mark associated with the visual area and identify discriminating features by generating an ROI. The image processing unit 106 then transmits the generated ROI to a server 118. The server 118 is configured to map the discriminating features of the determined visual mark using a siamese neural network 408. The server 118 is not limited to the siamese neural network 408, but may also include any ANN.

In an embodiment, the siamese neural network 408 is a class of neural network architectures that contain two or more identical sub-networks having same configuration of parameters/weights. The updated parameters/features are also mirrored across the sub-networks. The siamese neural network 408 is used to find a similarity or relationship between two comparable objects/marks. The siamese neural network 408 minimizes a contrastive loss function which enables it to learn useful features that correspond to the distances between similar and dissimilar inputs. A large distance in a siamese feature space implies dissimilar inputs, whereas smaller distance implies similar inputs.

In an embodiment, a contrastive loss is determined by the following Equation (1):

$$(1-Y)\tfrac{1}{2}Dw^2+(Y)\tfrac{1}{2}(\max(0,m-Dw))^2 \qquad (1)$$

where, Dw is Euclidean distance between outputs of the sub-networks;

Y is 1 or 0, if the inputs of the sub-networks are from same class, the value of Y is 0, otherwise is 1; and m is a margin value of the sub-networks, which is greater than 0.

A margin indicates dissimilar pairs that are beyond to the margin value which will not contribute to the loss. In an embodiment, in siamese neural network 408, similar inputs are pulled closer, and dissimilar objects are pushed apart beyond the margin.

In an embodiment, the server 118 is configured to maintain a global feature map, aggregating all local features from the primary display devices 202, wherein the features are mapped on D-dimensional space, and the features are D-dimensional features 306, as shown in 410. As shown in 412, the server 118 is further configured to classify a multi-system operator 408, and identify a provider associated with a set top box connected with a secondary display device 208, as shown in 414.

In an embodiment, once the user has setup one-remote feature either manually or by automatic detection, any future logo changes are monitored by the primary display device 202 by analyzing logos on STB menu/guide screens (UI screens). On change detection, the primary display device 202 identifies the changed logo by capturing and analyzing static regions in the UI screens. The primary display device 202 converts the logo region to a feature vector using a machine learning model, which is trained to distinguish between similar and dissimilar image pairs. The feature vector for a new MSO logo is saved and also shared with secondary display devices 208 through a server 118. The secondary display devices 208 compare these features with a feature present on a UI screen using a siamese network, where feature distance is smaller than a threshold confirms the connected MSO. This enables each display device to learn (i.e., recognize) the connected STB without re-training the machine learning model.

Figure 5:
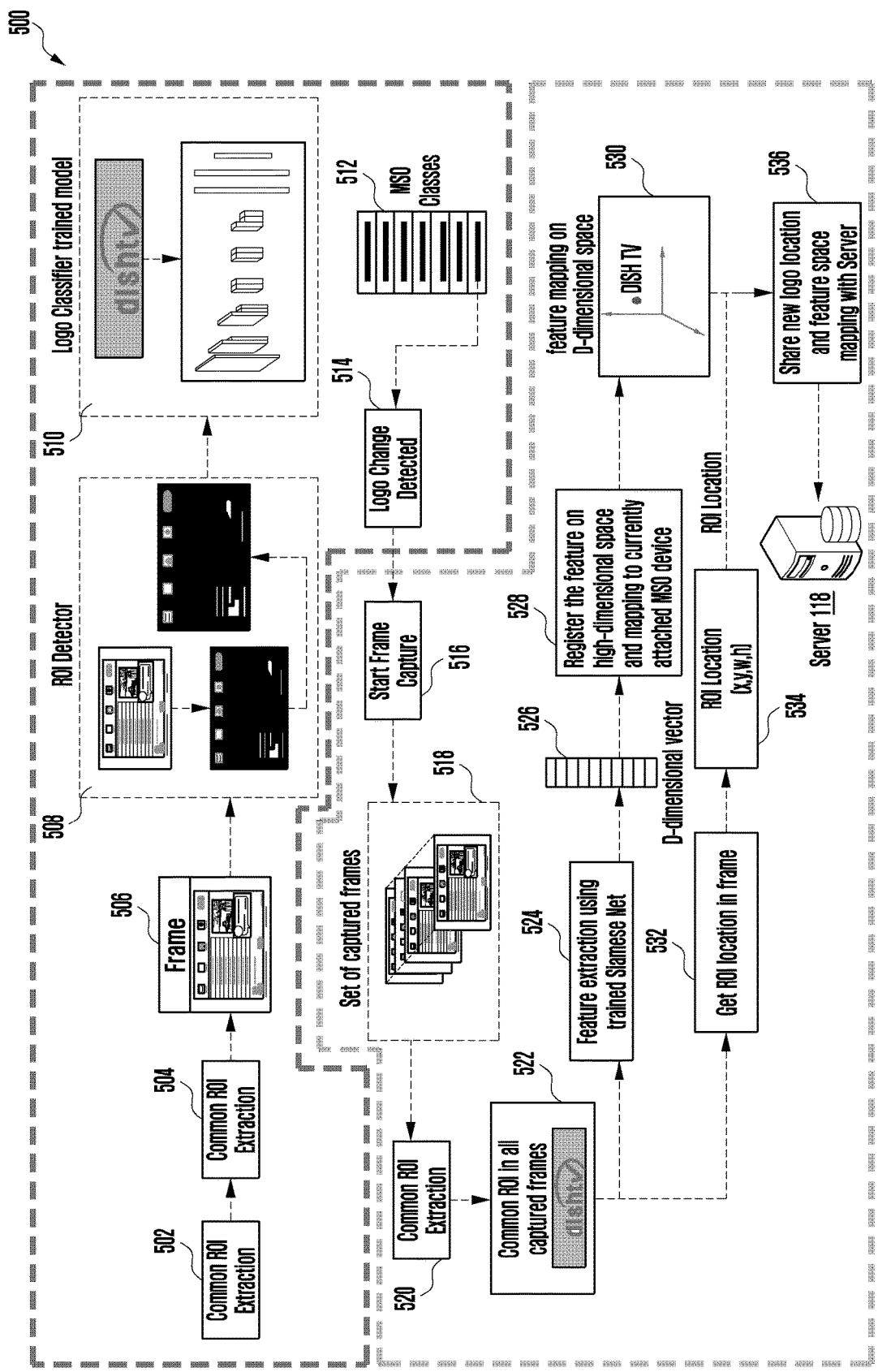
FIG. 5 illustrates a schematic diagram depicting identifying changes in an index, according to an embodiment.

FIG. 5 illustrates a schematic diagram 500 depicting identifying the changes in a visual mark, according to an embodiment.

In FIG. 5, the platform 100 is configured to detect the change in a visual mark at a primary display device 202 side. In an embodiment, the platform 100 includes a user input module 502, where a user is configured to perform setup of the STB on the primary display device 202. The setup can be performed either manually by the user or through auto-detection by the primary display device 202. When the user presses a key of a remote unit associated with the primary display device 202, the user input module 502 is configured to take as an input from the user, and the platform 100 checks if there is any visual mark changes since last setup.

In an embodiment, a detection module 108 includes a frame extractor 504 configured to detect and extract one or more frames of display content from the primary display device 202. The detected frame is shown in 506. A detection module 108 is configured to capture one or more frames, and detect an ROI.

In an embodiment, the detection module 108 includes an ROI detector 508 configured to generate ROI.

In an embodiment, the primary display device 202 determines a visual mark in a neural network having a logo classifier trained model, as shown in 510, classifies a multi-system operator using a pre-defined multi-system class as shown in 512, and detects a visual mark change 514.

In an embodiment, the visual mark change is detected if the user had previously setup the MSO using either manual or through automatic setup, and currently the platform 100 detects no visual mark.

In an embodiment, the platform 100 is configured to start capture a set of frames 516 across pre-defined time duration, whenever user presses a key of the remote unit associated with a display device. A set of frames is shown at 518. The platform 100 is further configured to extract common ROI 520 from the frames. The common ROI in the frames is shown at 522. A feature of the ROI is extracted using a trained siamese neural network, as shown in 524, and an identified D-dimensional vector 526. Thereafter, the platform 100 is configured to register the feature on a high D-dimensional space, and map it to an STB currently attached with the primary display device 202.

In an embodiment, the primary display device 202 is configured to map a feature on a D-dimensional space by registering the feature in the space, as shown in 530, and share a new visual mark location and feature space with the server 118, as shown at 536.

In an embodiment, after extraction of a common ROI in the frames as shown at 522, if the ROI location in the frame is detected as shown in 532, the primary device 202 directly shares a new visual mark location and feature space with the server 118, as shown at 536.

In an embodiment, the ROI location is in (x, y, w, h) coordinates, as shown at 534.

Figure 6:
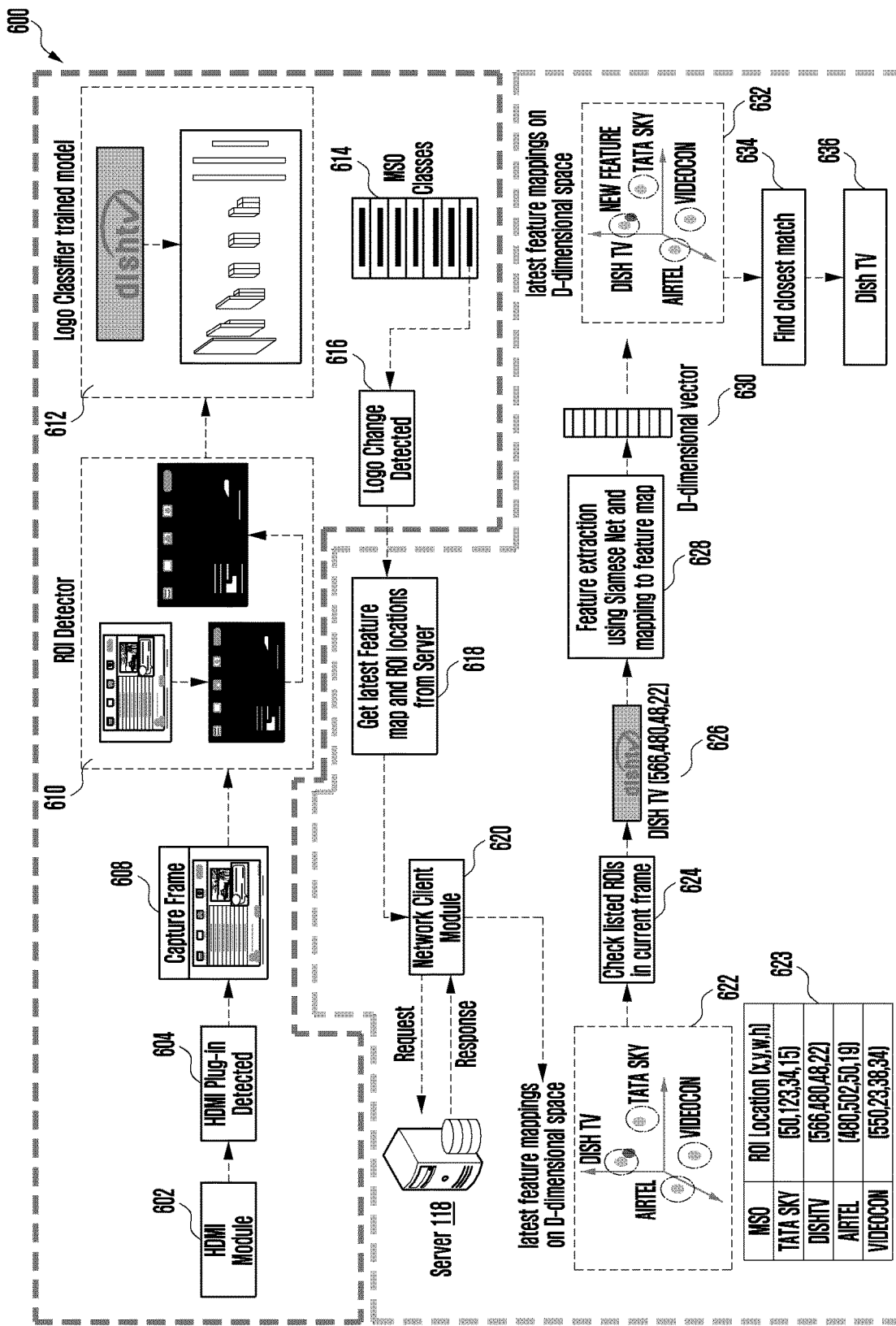
FIG. 6 illustrates a schematic diagram depicting connecting a secondary display device to a set top box device with a changed index, according to an embodiment.

FIG. 6 illustrates a schematic diagram 600 depicting connecting a secondary display device to an STB with a changed visual mark, according to an embodiment.

In FIG. 6, the platform 100 is configured to detect the change in visual mark at a secondary display device 208 side. The platform 100 includes an HDMI module 602, where the secondary display device 208 is configured to be connected with the STB using the HDMI module 602.

In an embodiment, the HDMI module 602 is one type of connection between the secondary display device 208 and the STB. The platform 100 is then configured to detect HDMI plug-in 604. If the plug-in 604 is detected, the platform 100 is configured to capture one or more frames 608. A detection module 108 is further configured to detect an ROI.

In an embodiment, the detection module 108 includes an ROI detector 610 configured to generate an ROI.

In an embodiment, the secondary display device 208 determines a visual mark in a neural network having a logo classifier trained model, as shown in 612, and classifies an MSO using a pre-defined MSO class as shown in 614, and detects a visual mark change. If the visual mark change is detected as shown in 616, a server 118 is configured to get a latest feature map and an ROI location as shown in 618.

In an embodiment, a network client module 620 is configured to request to the server 118 the new MSO mappings with ROIs and their D-dimensional features, where the ROI location is in the form of (x, y, w, h) coordinates, as shown at 622.

For example, the MSO such as TATASKY® having (50, 123, 34, 15) ROI location, DISHTV® having (566, 48, 48, 22) ROI location, AIRTEL® having (480, 502, 50, 19) ROI location, and VIDEOCON® having (550, 23, 38, 34) ROI location, and their corresponding D-dimensional features are fetched from the server 118 to the secondary display device 208 on the D-dimensional space. Thereafter, the secondary display device 208 is configured to check listed ROIs in a current frame, as shown in 624, for example DISHTV® (566, 480, 48, 22) is detected as shown in 626. The secondary display device 208 is further configured to perform feature extraction using the neural network (i.e. a siamese neural network) and mapping on a feature map, as shown in 628, in a D-dimensional vector 630. The latest feature mappings on D-dimensional space having D-dimensional vector 630 is shown in 632. The secondary display device 208 is configured to find a closest match 634 of the DISHTV® in the D-dimensional space, and identify the updated visual mark 636.

Figure 7:
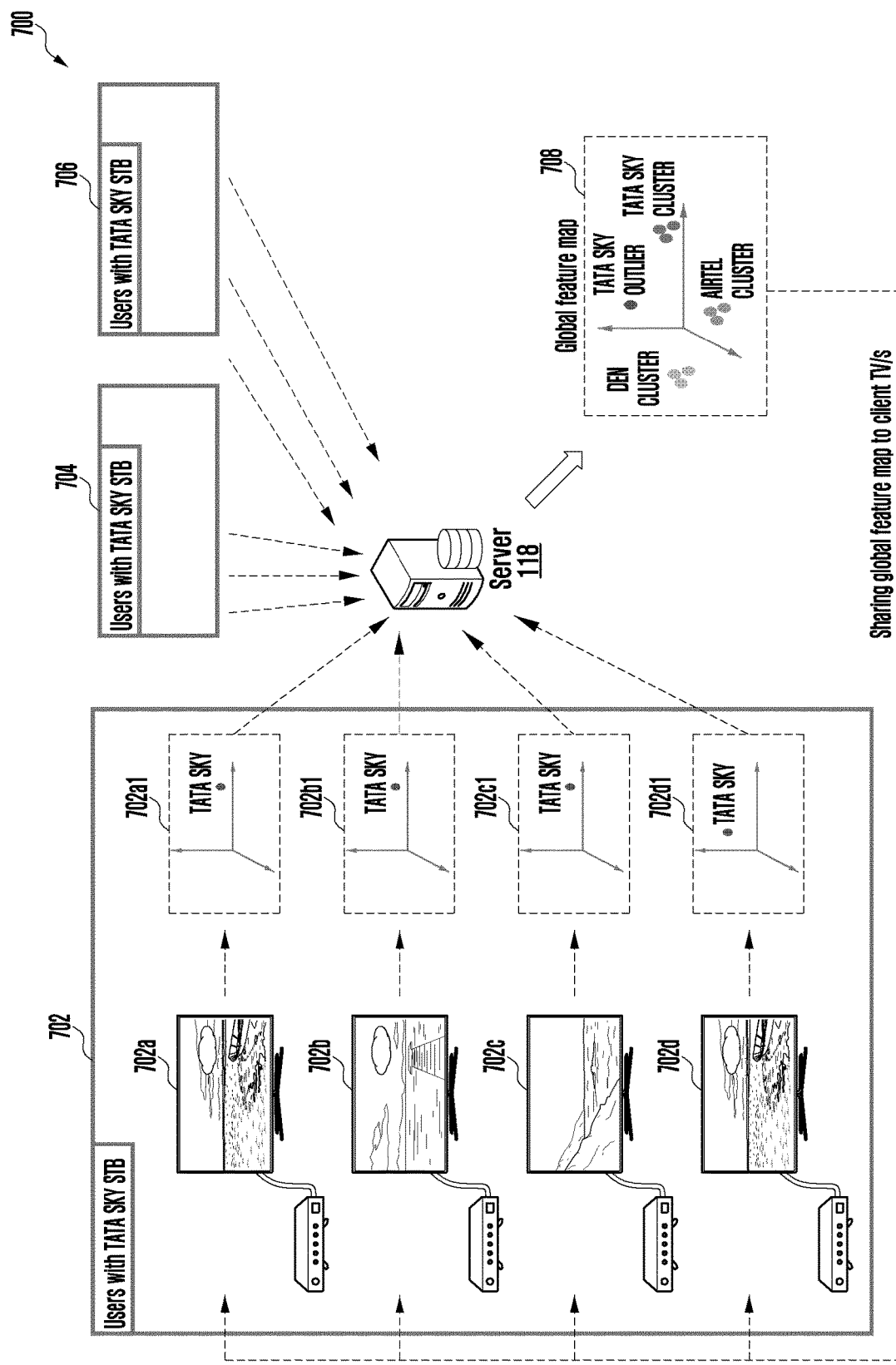
FIG. 7 illustrates a schematic diagram depicting a feature of sharing information among devices, according to an embodiment.

FIG. 7 illustrates a schematic diagram 700 depicting feature sharing among devices, according to an embodiment.

In FIG. 7, primary display devices 702a, 702b, 702c, and 702d associated with a plurality of users and having an STB, are configured to monitor visual mark changes and transmit corresponding feature maps 702a1, 702b1, 702c1, and 702d1 to a server 118. The server 118 is configured to collect all the feature maps from the primary display devices 202.

In an embodiment, the server 118 is configured to collect feature maps from different primary devices connected with different STBs associated with various MSOs, for example TATASKY®, AIRTEL®, and DEN®. The server 118 then calculates the cluster centroids for each MSO and register each MSO on a global feature map 708. The global feature map 708 is then shared with a primary display device 202 and a secondary display device 208.

Figure 8:
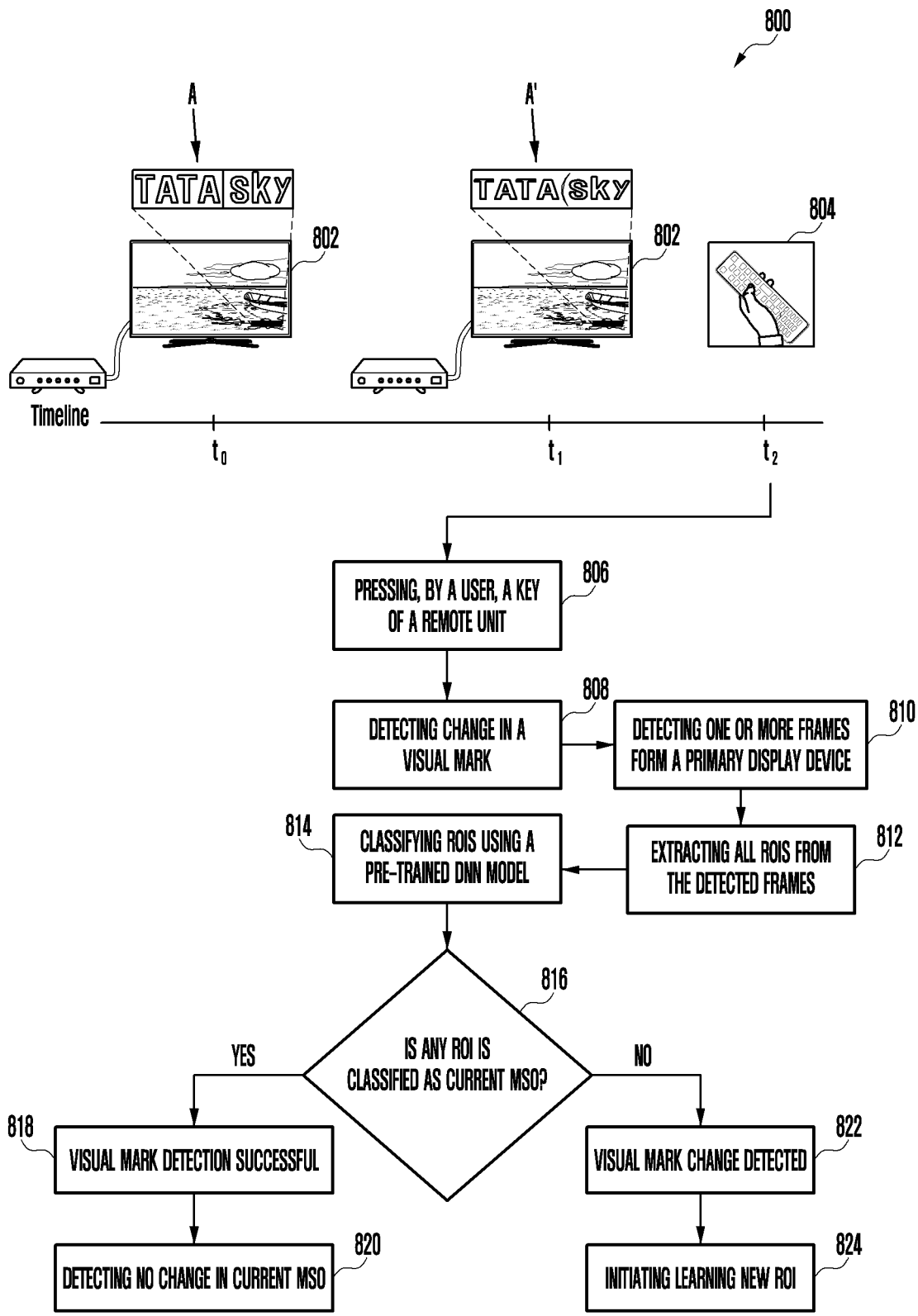
FIG. 8 illustrates a flow diagram depicting determining an indices change instance, according to an embodiment.

FIG. 8 illustrates a flow diagram 800 depicting determining a visual mark change instance, according to an embodiment.

In FIG. 8, a change in a visual mark A is detected as A', if the existing on-device 802 classification machine learning module fails to identify a visual mark region in the currently setup user interface screen. Since, the currently setup STB is already identified, and the visual mark of the STB was learned, any failure to identify the visual mark in the future indicates a change in the visual mark.

In an embodiment, a display device 802 has a visual mark A at the time of an initial setup $t_0$. If the MSO associated with STB updates the visual mark as A' at time $t_1$, then various steps are performed at time $t_2$. At step 806, a user presses a key of a remote unit 804. In an embodiment, a user provides an input to a primary display device 802 by pressing a key of a remote unit 804 associated with the primary display device 802.

At step 808, a change in a visual mark is detected. In an embodiment, an image processing unit 106 is configured to detect change in a visual mark as A'.

At step 819, one or more frames are detected from the primary display device 802. In an embodiment, a detection module 108 of the image processing unit 106 is configured to detect one or more frames from the primary display device 802.

At step 812, ROIs are extracted from the detected frames. In an embodiment, a detection module 108 is configured to extract ROIs from the detected frames.

At step 814, ROIs are classified using a pre-trained deep neural network (DNN) model. In an embodiment, the detection module 108 is configured to classify ROIs using a pre-trained DNN model.

At step 816, An ROI is checked whether it is classified as a current MSO. If the ROI is classified as a current MSO, visual mark detection successful, as shown at step 818. In an embodiment, the determination module 110 is configured to detect visual mark.

At step 820, no change in current MSO is detected. In an embodiment, the determination module 110 is configured to detect no change in current MSO.

If an ROI is not classified as a current MSO, a visual mark change is detected as shown at step 822. In an embodiment, a server 118 is configured to identify visual mark change.

At step 824, learning a new ROI is initiated. In an embodiment, the server 118 is configured to initiate learning of a new ROI.

Figure 9:
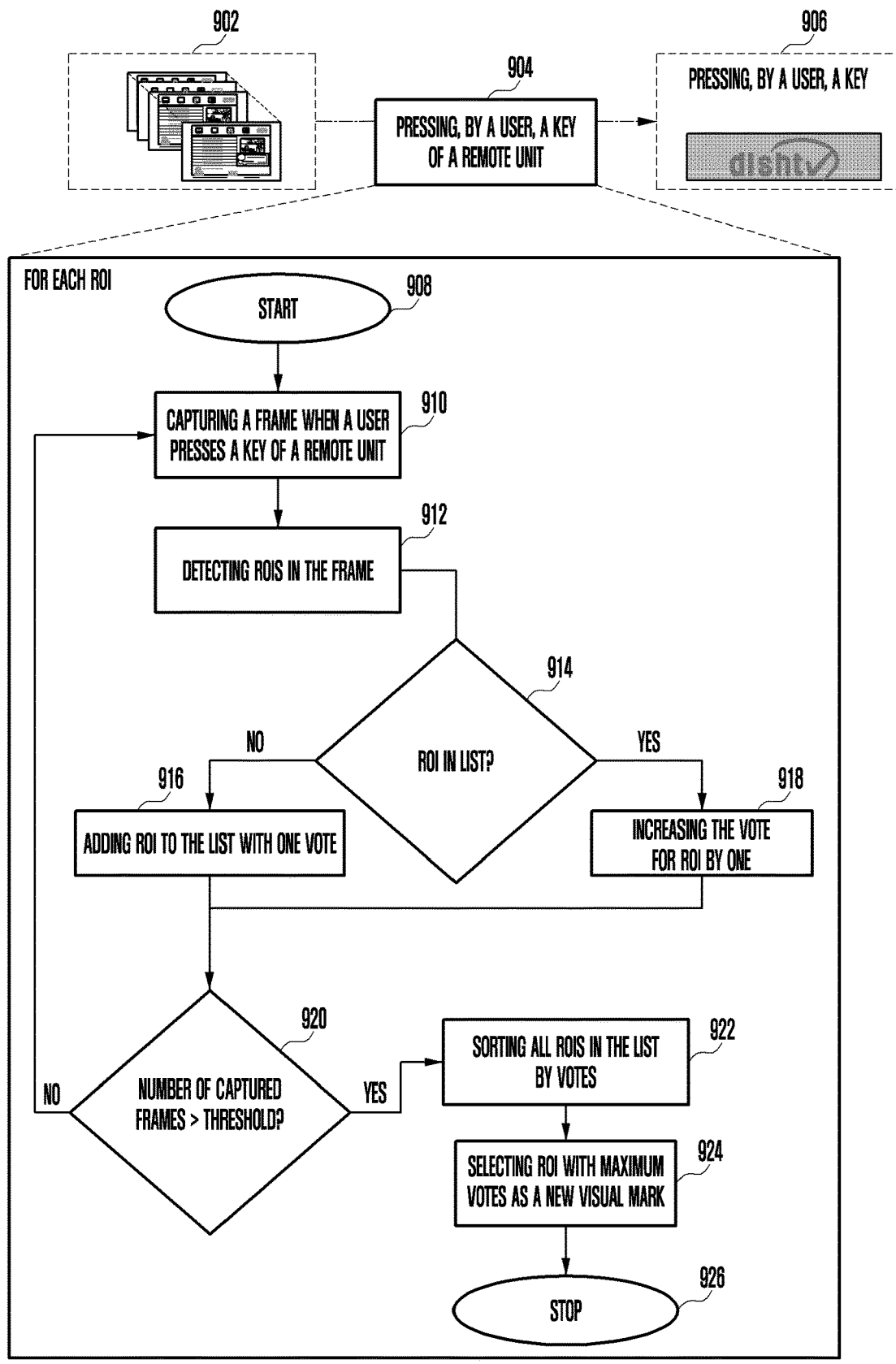
FIG. 9 illustrates a flow diagram depicting determining a new index, according to an embodiment.

FIG. 9 illustrates a flow diagram depicting determining a new visual mark, according to an embodiment.

In FIG. 9, all MSOs provide the visual mark on a display content of a primary display device 202. The primary display device 202 is associated with an STB. By analyzing the display content of the primary display device 202, a determination module 110 is configured to identify the static ROIs that contain a new visual mark or an updated visual mark. A single ROI for the visual mark can be selected with confidence if its vote count exceeds a pre-defined threshold. The platform 100 is further configured to extract common ROIs 904 from the frames 902. The common ROIs in the frames are shown at 906. To extract the common ROIs, various steps are performed.

The flow diagram starts at step 908. At step 910, a frame is captured when a user presses a key of a remote unit. In an embodiment, a user provides an input to a primary display device 202 by pressing a key of a remote unit associated with the primary display device.

At step 912, ROIs are determined in the frame 902. In an embodiment, a detection module 108 is configured to determine ROIs in the frame 902.

At step 914, each ROI is checked whether it is included in a list. In an embodiment, the detection module 108 is configured to check whether an ROI is in a list.

If the ROI is not in the list, the ROI is added to the list with one vote as shown at a step 916. In an embodiment, the detection module 108 is configured to add an ROI to the list with one vote.

If the ROI is in the list, the vote for ROI is increased by one as shown at a step 918. In an embodiment, the detection module 108 is configured to increase the vote for ROI by one.

At step 920, it is checked the number of captured frames is greater than threshold. In an embodiment, the detection module 108 is configured to check whether the number of captured frames is greater than threshold.

If the number of captured frames is less than the threshold, steps the process reverts to step 910. If the number of captured frames is greater than the threshold, all ROIs are sorted in the list by votes as shown at step 922. In an embodiment, a detection module 108 is configured to sort all ROIs in the list by votes.

At step 924, an ROI with maximum votes is selected as a new visual mark. In an embodiment, a determination module 110 is configured to select the ROI with maximum votes as a new visual mark.

At a step 926, the process is finished.

Figure 10:
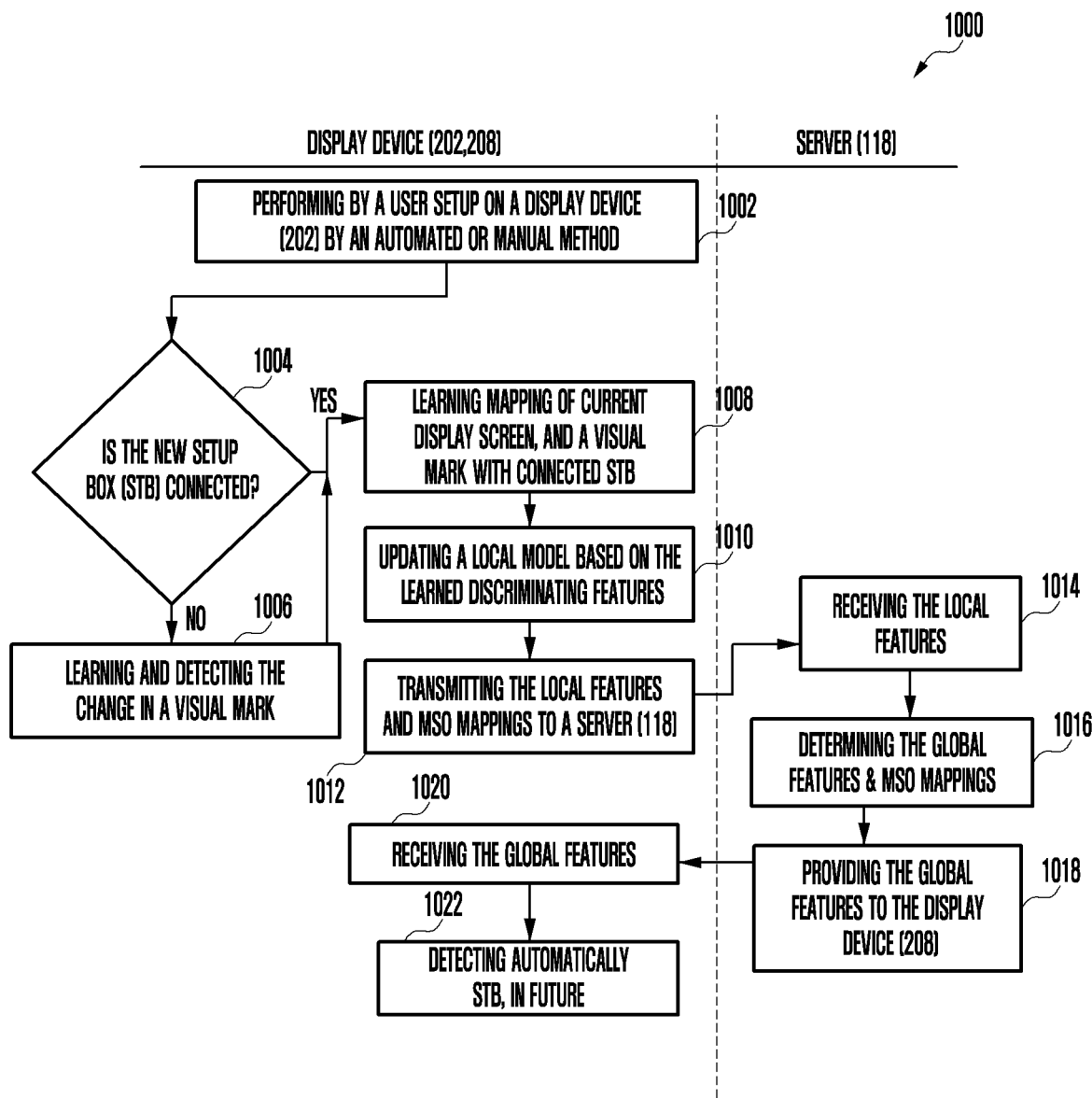
FIG. 10 illustrates a flow diagram depicting a basic workflow of an automated learning platform, according to an embodiment.

FIG. 10 illustrates a flow diagram 1000 depicting a basic workflow of FIG. 1, according to an embodiment.

The workflow 1000 is performed between the primary display device 202, the secondary display device 208 and a server 118. At step 1002 a user performs a setup on a primary display device 202 by an automated or manual method. In an embodiment, a user is configured to perform setup on the primary display device 202 by using a remote unit associated with the primary display device 202.

At step 1004, it is checked whether the STB is connected. In an embodiment, the primary display device 202 is configured to check whether the new STB is connected or not.

If the new STB is not connected, a change in a visual mark is detected and recognized, as shown at step 1006. In an embodiment, an image processing unit 106 of the primary display device 202 is configured to learn (i.e., recognize) and detect the change in a visual mark associated with the STB.

If the new STB is connected, mapping of current display screen is recognized, and a visual mark connected with the STB is recognized as shown at step 1008. In an embodiment, the image processing unit 106 of the primary display device 202 is configured to learn mapping of a current display screen with a connected STB, and learn mapping of a visual mark with the connected STB.

At step 1010, a local model is updated based on the learned discriminating features. In an embodiment, the image processing unit 106 of the primary display device 202 is configured to update a local model based on the learned discriminating features.

At step 1012, local features and MSO mapping are transmitted to a server 118. In an embodiment, the image processing unit 106 of the primary display device 202 is configured to transmit local features and MSO mapping to a server 118.

At a step 1014, the local features are received. In an embodiment, the server 118 is configured to receive the local features from the primary display device 202. At step 1016, the global features and MSO mapping are determined. In an embodiment, the server 118 is configured to determine the global features.

At step 1018, the global features are provided to a secondary display device 208. In an embodiment, the server 118 is configured to provide the global features to the secondary display device 208.

At step 1020, the global features are received. In an embodiment, the secondary display device 208 is configured to receive the global features.

At a step 1022, STB are automatically detected in the future. In an embodiment, the secondary display device 208 is configured to detect, automatically, STB in the future.

Figure 11:
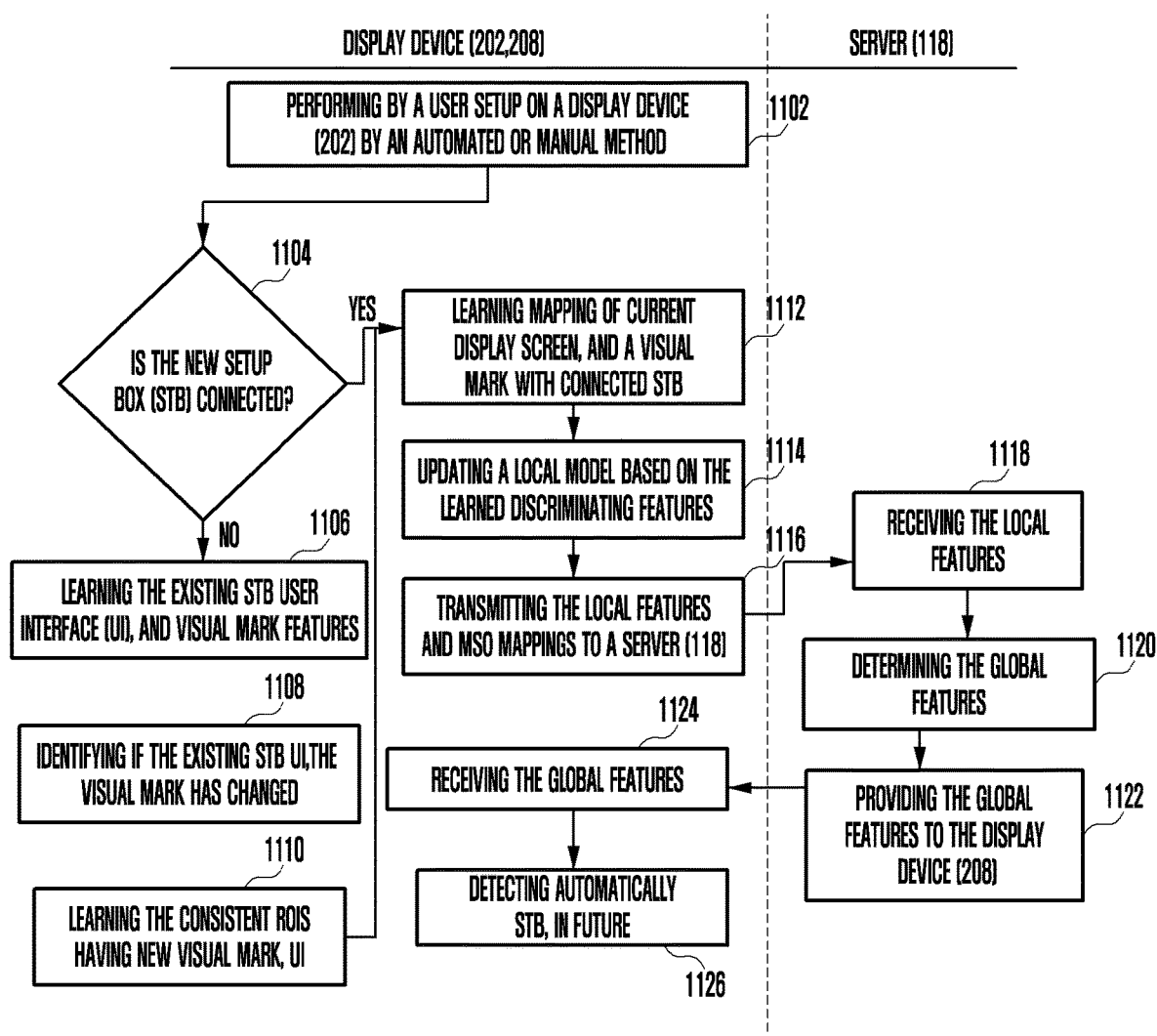
FIG. 11 illustrates a flow diagram depicting a detailed workflow of an automated learning platform, according to an embodiment.

FIG. 11 illustrates a flow diagram depicting a detailed workflow 1100 of FIG. 1, according to an embodiment.

The workflow 1100 is performed between the primary display device 202, the secondary display device 208 and a server 118. At step 1102, a user performs setup on a display device 202 by an automated or manual method. In an embodiment, a user is configured to perform setup on the primary display device 202 by using a remote unit associated with the primary display device 202.

At a step 1104, it's checked whether the new set top box (STB) connected. In an embodiment, the primary display device 202 is configured to check whether the new STB is connected or not.

If the new STB is not connected, the existing STB UI and visual mark features are learned (i.e., recognized and/or stored), as shown at step 1106. In an embodiment, an image processing unit 106 of the primary display device 202 is configured to learn the existing STB UI and visual mark features.

At step 1108, it is identified whether the visual mark of the existing STB UI has changed. In an embodiment, an image processing unit 106 of the primary display device 202 is configured to identify that the visual mark of the existing STB UI has changed.

At step 1110, consistent ROIs having a new visual mark and UI are learned. In an embodiment, an image processing unit 106 of the primary display device 202 is configured to learn the consistent ROIs having a new visual mark and UI.

If the new STB is connected, the current display screen and a visual mark with a connected STB are mapped, as shown at step 1112. In an embodiment, the image processing unit 106 of the primary display device 202 is configured to learn mapping of a current display screen, and map a visual mark with the connected STB.

At step 1114, a local model is updated based on the learned discriminating features. In an embodiment, the image processing unit 106 of the primary display device 202 is configured to update a local model based on the learned discriminating features.

At step 1116, local features and MSO mappings are transmitted to a server 118. In an embodiment, the image processing unit 106 of the primary display device 202 is configured to transmit local features and MSO mappings to a server 118.

At step 1118, the local features are received. In an embodiment, the server 118 is configured to receive the local features from the primary display device 202.

At step 1120, the global features and MSO mapping are determined. In an embodiment, the server 118 is configured to determine the global features.

At step 1122, the global features are provided to a display device 208. In an embodiment, the server 118 is configured to provide the global features to the secondary display device 208.

At step 1124, the global features are received. In an embodiment, the secondary display device 208 is configured to receive the global features.

At step 1126, the STBs are automatically detected in the future. In an embodiment, the secondary display device 208 is configured to automatically detect the STBs in the future.

Figure 12:
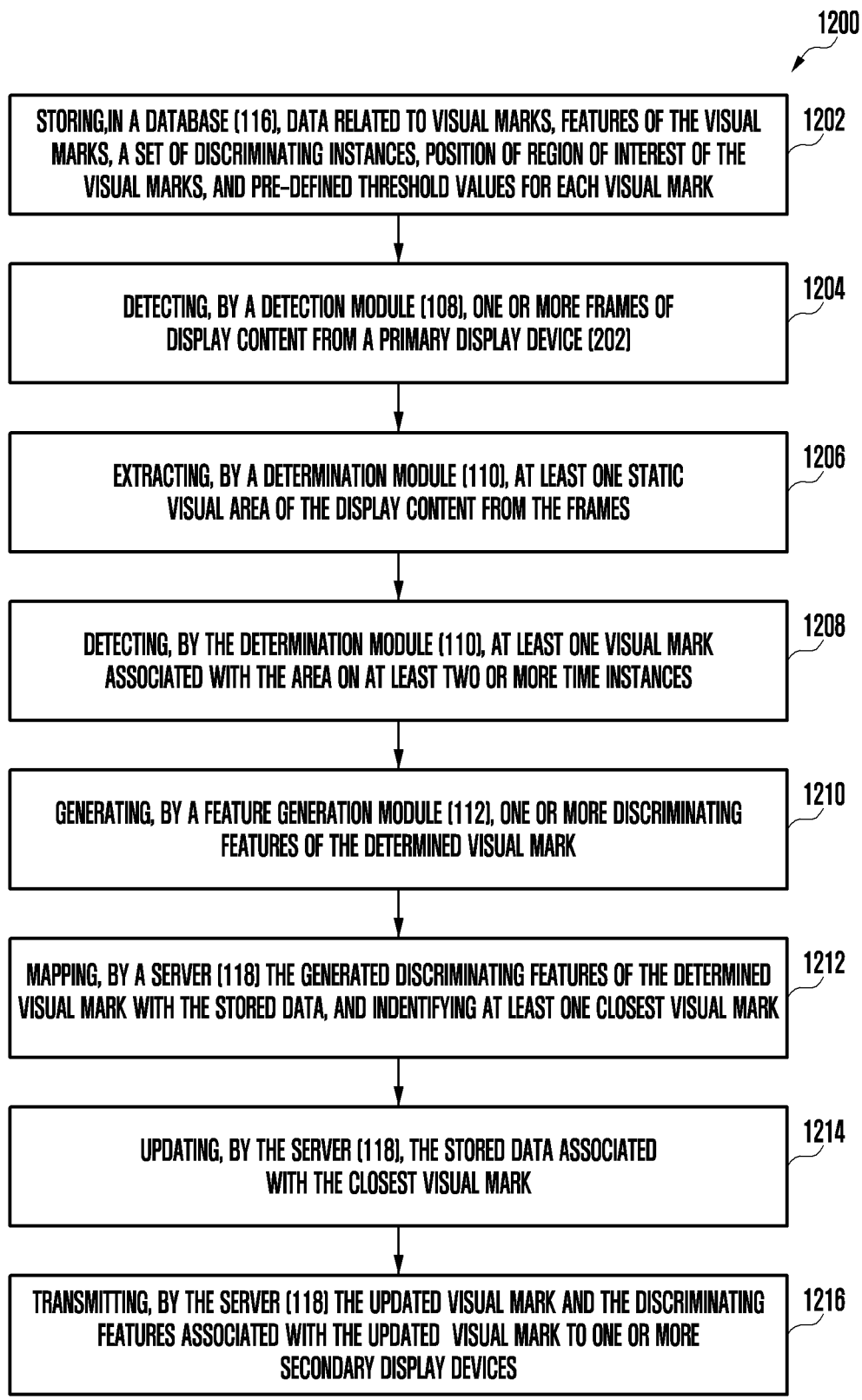
FIG. 12 illustrates a flowchart depicting a method for automated learning of a content provider, according to an embodiment.

FIG. 12 illustrates a flowchart 1200 depicting a method for automated learning of a content provider, according to an embodiment.

The flowchart 1200 starts at step 1202, where data related to visual marks, features of the visual marks, a set of discriminating instances, a position of an ROI of the visual marks, and pre-defined threshold values for each visual mark are stored in a database 116. In an embodiment, a database 116 is configured to store data related to visual marks, features of the visual marks, a set of discriminating instances, a position of an ROI of the visual marks, and pre-defined threshold values for each visual mark.

At step 1204, a detection module 108 detects one or more frames of display content from a primary display device 202. In an embodiment, a detection module 108 is configured to detect one or more frames of display content from a primary display device 202.

At step 1206, a determination module 110 extracts at least one static visual area of the display content from the frames. In an embodiment, a determination module 110 is configured to extract at least one static visual area of the display content from the frames.

At step 1208, the determination module 110 determines at least one visual mark associated with the area on at least two or more time instances. In an embodiment, a determination module 110 is configured to determine at least one visual mark associated with the area on at least two or more time instances.

At step 1210, a feature generation module 112 generates one or more discriminating features of the determined visual mark. In an embodiment, a feature generation module 112 is configured to generate one or more discriminating features of the determined visual mark.

At step 1212, a server 118 maps the generated discriminating features of the determined visual mark with the stored data, and identifies at least one closest visual mark. In an embodiment, a server 118 is configured to map the generated discriminating features of the determined visual mark with the stored data, and identify at least one closest visual mark.

At step 1214, the server 118 updates the stored data associated with the closest visual mark. In an embodiment, the server 118 is configured to update the stored data associated with the closest visual mark.

At a step 1216, the server 118 transmits the updated visual mark and the discriminating features associated with the updated visual mark to one or more secondary display devices 208. In an embodiment, the server 118 is configured to transmit the updated visual mark and the discriminating features associated with the updated visual mark to one or more secondary display devices 208.

FIGS. 13-16 illustrate use-case scenarios depicting an automated learning platform, according to various embodiments.

Figure 13:
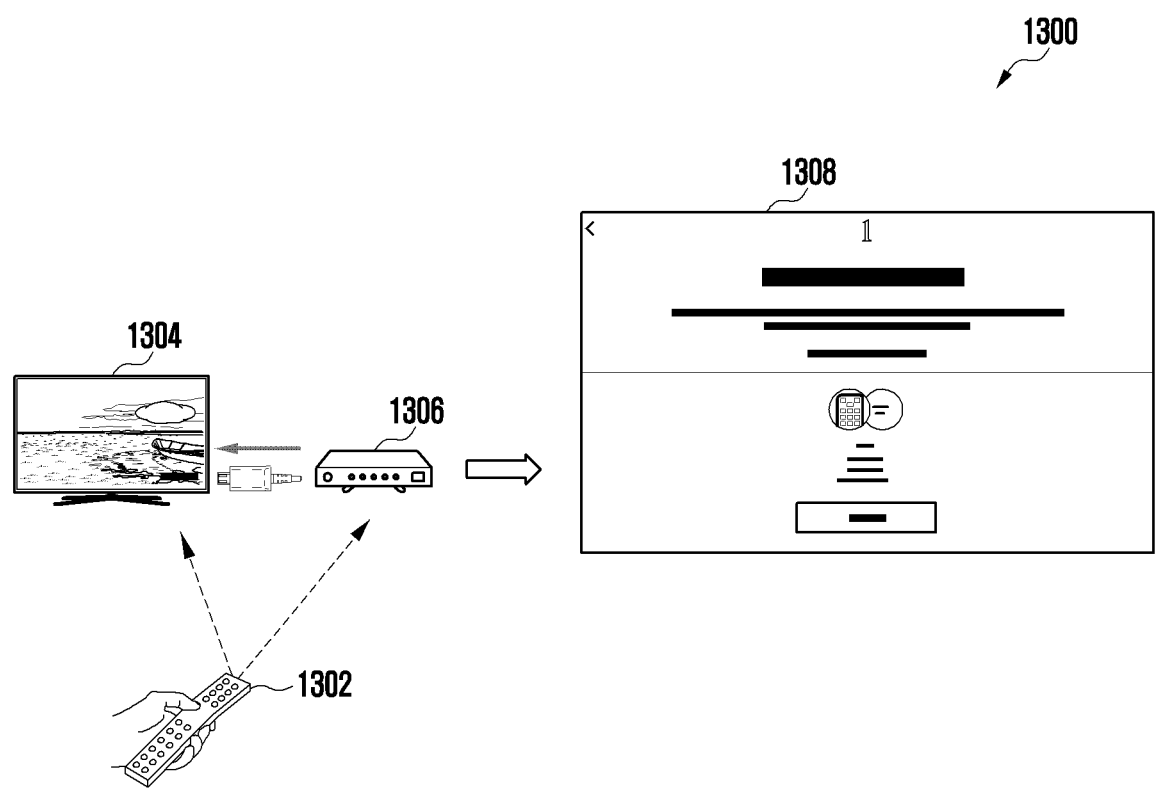
FIG. 13 illustrates a use-case scenario depicting an automated learning platform, according to an embodiment.

FIG. 13 illustrates a use case scenario 1300 depicting one-remote service. The platform 100 is configured to provide one-remote service, where a remote unit 1302 controls both the display device 1304 and the connected STB 1306. Even in the event of a visual mark change, the changed features can be learned and applied on the display device 1304.

Figure 14:
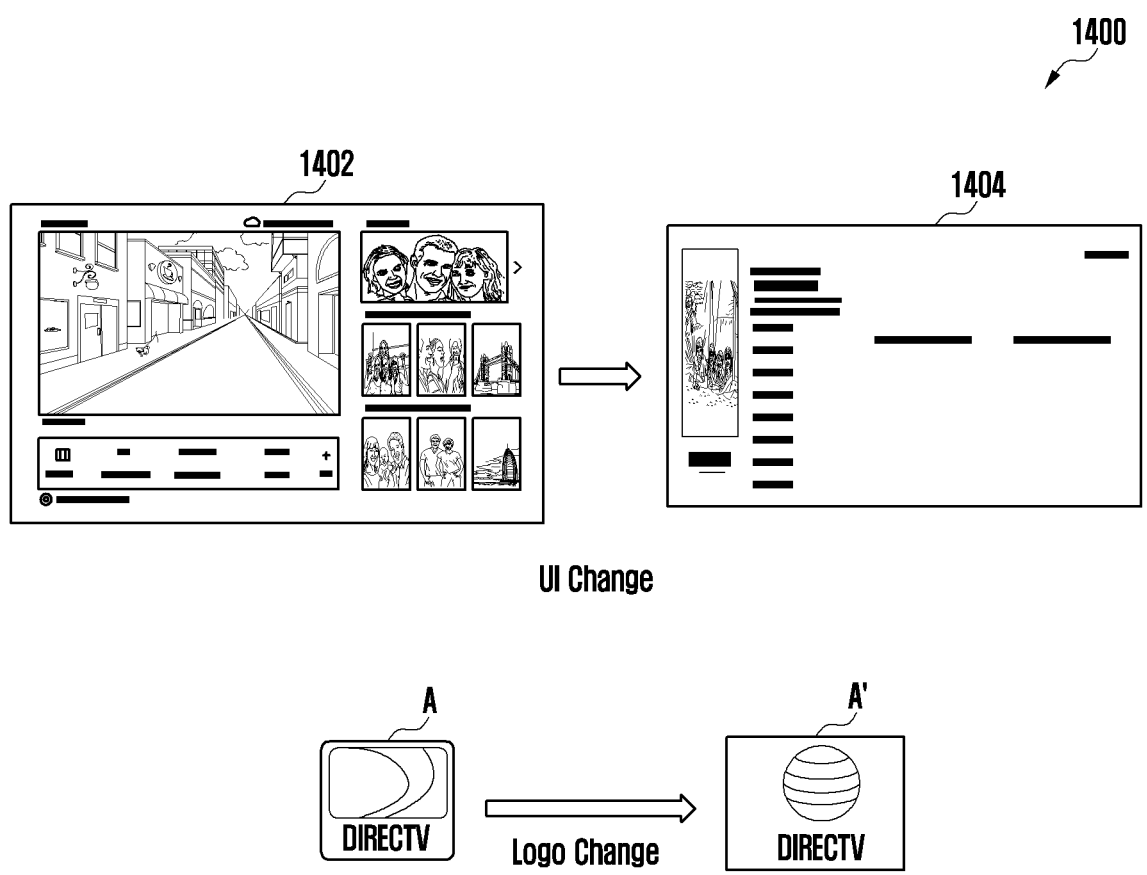
FIG. 14 illustrates a use-case scenario depicting an automated learning platform, according to an embodiment.

FIG. 14 illustrates a use case scenario 1400 depicting visual mark/UI change detection for currently registered STBs. After the initial setup, any change in the Home or Guide layout of the STB UI 1402 is detected 1404. Also a change in the MSO visual mark A is detected on a display device, and the display device learns the new UI or visual mark A' for the MSO.

Figure 15:
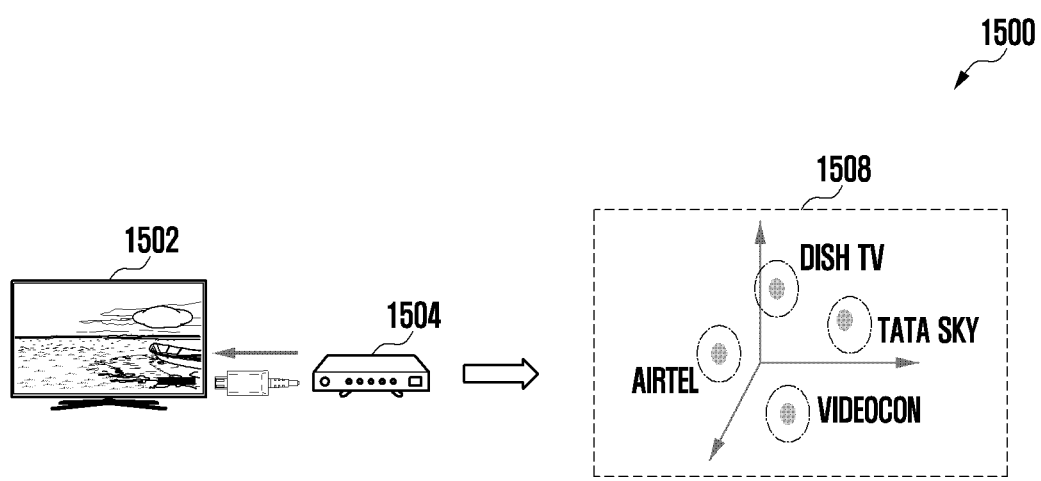
FIG. 15 illustrates a use-case scenario depicting an automated learning platform, according to an embodiment.

FIG. 15 illustrates a use case scenario 1500 depicting easy registration for a new STB. When a new MSO STB 1504 is connected to a display device 1502, a user's input will be taken. The input includes device details. Discriminating features will be learned and registered for the new MSO 1506. These discriminating features will be used to identify the display device 1502.

Figure 16:
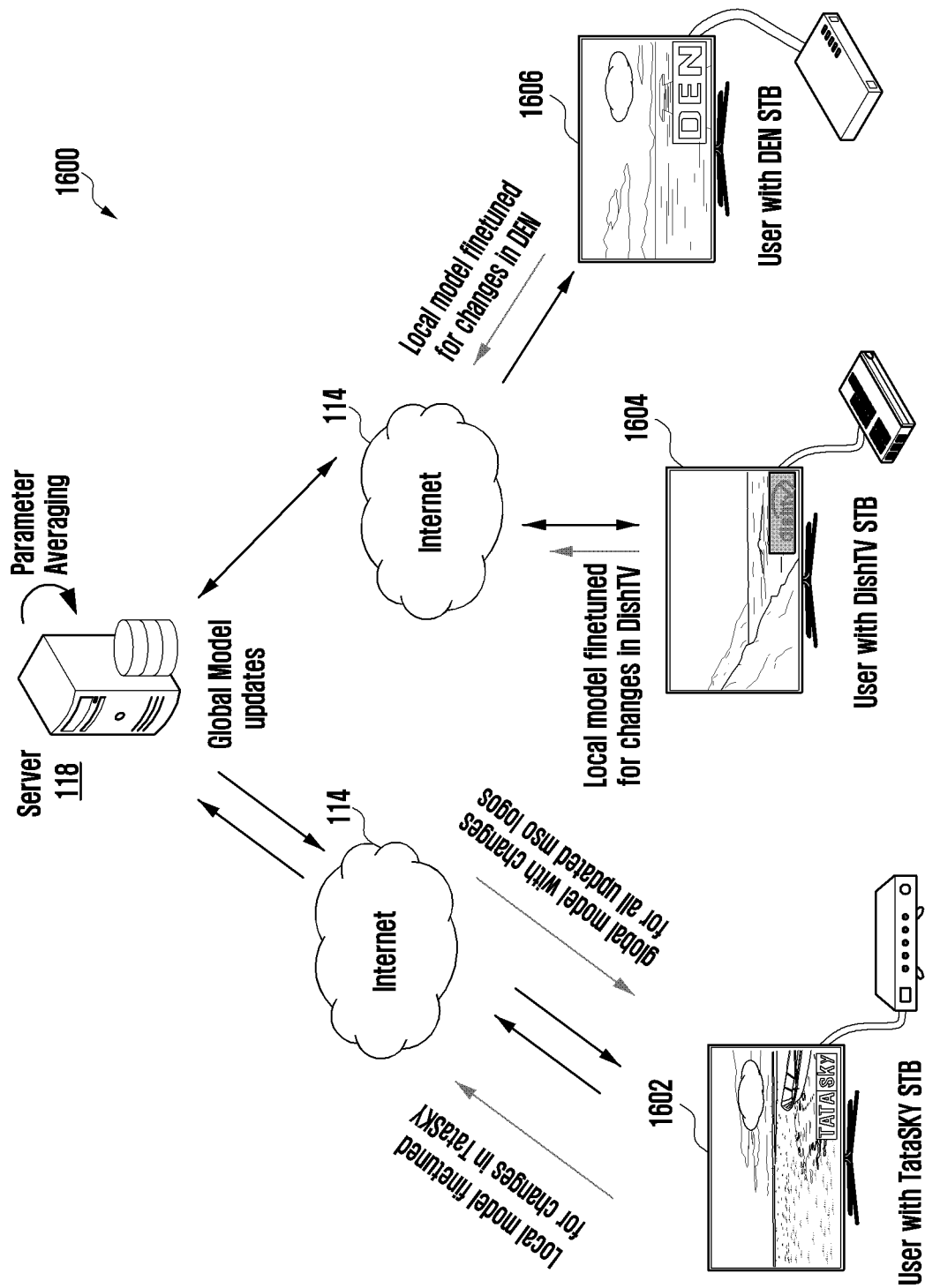
FIG. 16 illustrates a use-case scenario depicting an automated learning platform, according to an embodiment.

FIG. 16 illustrates a use case scenario 1600 depicting sharing learned model among devices. A display device 1602 learns the new visual mark and the UI for the MSO, and shares binary discriminating features to other display device(s) 1606. The platform 100 enables automatic detection of new MSOs on other display device(s) 1606. In an embodiment, a display device 1602 with TATASKY® STB, a display device 1604 with DISHTV® STB, and a display device 1606 with DEN® STB, are communicatively coupled with a server 118. The display devices 1602, 1604, and 1606 are configured to transmit a local model fine tuned for changes in TATASKY®, DISHTV®, or DEN®. The server 118 has parameter averaging and global feature updates. The server 118 shares the global features with changes for all updated MSO logos.

Accordingly, the technical advancements of the platform 100 of the present disclosure are an improved customer experience by providing a one-remote function, an automatic expansion of the one-remote function to cover a plurality of service providers, distributed learning to eliminate the need for data collection and storage, reduced maintenance cost, no field visits, no need for manual data annotation and machine learning model training, no need to maintain multiple remotes for controlling each device connected to display devices, and easy configuration as compared to manual universal remote setup.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method for automated learning of a content provider, the method comprising:
    storing, in a database, data related to indices, features of the indices, a set of discriminating instances, a position of a region of interest (ROI) of the indices, and pre-defined threshold values;
    detecting one or more frames of display from a primary display device;
    extracting at least one static visual area of the display from the frames;
    determining at least one index associated with the area based on at least two or more time instances;
    generating one or more discriminating features of the determined index;
    mapping, by a server, the generated discriminating features of the determined index with the stored data, and identifying at least one closest index;
    updating, by the server, the stored data associated with the closest index; and
    transmitting, by the server, the updated index and the discriminating features associated with the updated index to one or more secondary display devices.

2. The method of claim 1, wherein the indices are associated with one or more set top box operators, content providers or multi-system operators.

3. The method of claim 1, wherein the discriminating features of the determined index on the time instances are generated by using a visual analysis.

4. The method of claim 1, wherein the method further comprising:
    aggregating discriminating features of one or more primary display devices, and generating a feature map;
    mapping, by the server, the aggregated discriminating features of the determined indices with the stored data, and identifying at least one closest index;
    updating, by the server, the stored data associated with the closest index; and
    transmitting, by the server, the updated index and the discriminating features associated with the updated index to the secondary display devices.

5. The method of claim 4, further comprising:
    generating, by each secondary display device, an index region; and
    identifying a closest match based on the generated feature map.

6. The method of claim 1, further comprising:
    capturing a set of frames of the display; and
    detecting one or more ROIs in the set of frames.

7. The method of claim 6, further comprising:
    classifying the ROIs, if the captured set of frames are within the pre-defined threshold values.

8. The method of claim 4, wherein the feature map is generated, by the server, using a neural network having at least two or more identical sub-networks.

9. The method of claim 8, wherein the neural network includes a siamese neural network, and an artificial neural network (ANN).

10. The method of claim 4, further comprising:
    filtering, by the server, outliers from a plurality of clusters of the feature map for each index.

11. The method of claim 10, further comprising:
    computing, by the server, cluster centroids for each visual mark, and registering the visual mark on the feature map.

12. The method of claim 1, wherein generating one or more discriminating features further comprises recognizing the discriminating features of the determined index on at least two instances.

13. The method of claim 1, further comprising:
    receiving, by the server, the instances with the discriminating features, including a learned model with a set of indices associated with a set of operators.

14. The method of claim 13, wherein the database is updated, by the server, based on at least one of the discriminating features, a set of discriminating instances, and one or more pre-defined rules.

15. The method of claim 13, further comprising:
    replicating, by the server, the learned model or the discriminating features on the secondary display devices.

16. The method of claim 15, further comprising:
    determining, by the secondary display device, at least one operator by utilizing the stored data.

17. The method of claim 16, further comprising:
    associating the secondary display device with a remote unit having an infrared (IR) code set of information mapped with the stored data.

18. The method of claim 17, further comprising:
    providing, by the remote unit, one-remote functionality, on the secondary display device.

19. An automated learning system of a content provider, the system comprising:
    a memory; and
    a processor configured to:
        store, in a database, data related to indices, features of the indices, a set of discriminating instances, a position of a region of interest (ROI) of the indices, and pre-defined threshold values;
        detect one or more frames of display from a primary display device;
        extract at least one static visual area of the display from the frames;
        determine at least one index associated with the area based on at least two or more time instances;
        generate one or more discriminating features of the determined index;
        map the generated discriminating features of the determined index with the stored data, and identify at least one closest index;
        update the stored data associated with the closest index; and
        transmit the updated index and the discriminating features associated with the updated index to one or more secondary display devices.

20. The system of claim 19, wherein the processor is further configured to:
    aggregate the discriminating features and generate a feature map; and
    map the aggregated discriminating features of the determined index received from the one or more primary display devices with the stored data.

* * * * *